United States Patent [19]

Hehn

[11] 4,184,594
[45] Jan. 22, 1980

[54] VIDEO CASSETTE STORAGE CONTAINER

[76] Inventor: Bruce A. Hehn, 110 Shepherd Ter., Clairsville, Ohio 43950

[21] Appl. No.: 972,386

[22] Filed: Dec. 22, 1978

[51] Int. Cl.² .............................................. B65D 85/67
[52] U.S. Cl. .................................... 206/387; 206/493; 220/339; 242/199
[58] Field of Search ................... 206/387, 446, 493; 220/339; 108/55.3; 242/199, 200

[56] References Cited

U.S. PATENT DOCUMENTS

| | | | |
|---|---|---|---|
| 2,444,326 | 6/1948 | Baker et al. | 108/55.3 |
| 3,610,552 | 10/1971 | Shirakura | 242/199 |
| 3,876,071 | 4/1975 | Neal | 206/387 |

Primary Examiner—William T. Dixson, Jr.
Attorney, Agent, or Firm—Frease & Bishop

[57] ABSTRACT

A storage container for securely holding and containing two different sizes of video cassettes therein by a pair of projections molded integrally with either the top or bottom wall of the container. One of the projections is a usual pair of annular concentric members which extends into one of the reel hub openings formed in the cassette. In accordance with the invention, the other projection preferably is an oval-shaped member formed by two semicircular arcuate sections which terminate in end posts. One of the arcuate sections extends into a second reel hub opening in the cassette and coincides with an outer arcuate curved section of the opening when storing a small size cassette, with the other arcuate section coinciding with an inner arcuate curved section of a reel hub opening when storing a larger size cassette. Alternately, the improved projection can be a pair of transversely spaced projection members formed on the container wall at a location determined by the imaginary overlapping of the cassette hub openings to be engaged by the improved projection. The top wall is movably connected to the bottom wall by a double hinged panel assembly. Flanges are formed on the hinged panel and top wall and have angled edges which abuttingly engage each other upon moving the top wall toward closed position to limit movement of the top wall toward closed position to properly align the container latching members when the top wall is in a fully closed position.

20 Claims, 15 Drawing Figures

VIDEO CASSETTE STORAGE CONTAINER

BACKGROUND OF THE INVENTION

1. Field of the Invention

The invention relates to containers, and in particular, to containers for storing video cassettes. More particularly, the invention relates to a single storage container which is adapted to receive and hold two different size cassettes currently being manufactured and sold for use with video cassette recorders and players, which cassettes constitute approximately 90% of the market today.

2. Description of the Prior Art

The use of video cassettes together with associated equipment is growing in popularity. These cassettes are used primarily to record programs directly from a television for replay, or else they are purchased with a program, movie or the like prerecorded thereon. It is desirable that these cassettes be shipped and stored in protective boxes or containers to prevent physical damage to the cassette during shipment, as well as to keep the cassette relatively dust free during storage.

The most common type of cassette container used today is an integrally molded rectangular-shaped plastic box of the type shown in U.S. Pat. Nos. 3,876,071 and 4,011,940. These types of containers have a pair of projections molded on the top or bottom wall which are adapted to seat in the reel openings formed in the cassette case. These projections position and retain the cassette within the container preventing it from rattling or moving about and have proven generally satisfactory for their intended use. Most of these containers use a double hinge-type of closure for connecting the lid or top wall of the container to the remainder of the container, as shown in the two above-mentioned patents. Provisions preferably are provided in these storage containers, as shown in U.S. Pat. No. 4,011,940, for aligning the closure lid and latch members with the remainder of the storage container.

These are two different size video cassettes presently being manufactured and sold for use today with the majority of the various available recording and playback equipment. This requires two different size storage containers to be produced, sold and stored by the various manufacturers and distributors in order to provide a complete range of video cassettes to the ultimate users or consumers.

There is no storage container for video cassettes of which I am aware which provides an inexpensive, rugged, dust-proof construction, preferably molded of plastic, which will store both sizes of cassettes firmly and securely, and in addition, provide a unique flange arrangement on the double hinge closure panel and lid to provide for properly aligning the closure tabs for the container when the lid is moved to a closed position.

SUMMARY OF THE INVENTION

Objectives of the invention include providing an improved video cassette storage container which will firmly hold two sizes of cassettes presently being manufactured and sold in the market today by means of an inexpensive, preferably oval-shaped projection formed integrally with the bottom or top wall of the storage container replacing the heretofore annular-shaped reel engaging projections of existing storage containers adapted for use with only a single size cassette; providing such a container construction which firmly holds two sizes of cassettes in position with respect to the container bottom or top wall when placed thereon prior to closing the lid which securely locks the cassette in its stored position; providing such a container in which a double hinged end panel or wall is provided with a pair of transverse flanges having angled edges which abuttingly engage angled edges formed on the ends of similar flanges formed on the inner surface of the lid, whereby the lid will be self-aligning upon closing so that the closure latches will align with their respective retaining members to prevent the latches from under or over shooting the opening of the retaining members; providing such a container which can be mass-produced relatively inexpensively by plastic molding procedures which provide both a shipping and storage container for both sizes of cassettes to prevent physical damage to the cassette during shipment and storage, as well as providing a relatively dust-free container.

These objectives and advantages are obtained by the improved video cassette storage container, the general nature of which may be stated as being of the type having spaced side, end, top and bottom walls forming a hollow enclosure for selectively containing first and second different size cassettes therein, in which each of the cassettes is formed with a pair of spaced reel hub openings with the spacing between the second cassette openings being greater than the spacing between the first cassette openings, and in which first and second projection means are mounted on either the top or bottom walls of the container and are spaced longitudinally from each other a predetermined distance on said wall for projecting into the pair of spaced reel hub openings formed in the cassettes for positioning and retaining individual first and second cassettes in said container, wherein the improvement includes the first projection means being formed by a plurality of spaced projections located adjacent to an imaginary oval-shaped configuration formed by the two overlapping arcuate portions of two circles, each circle representing a respective one opening of each of the hub openings of the first and second cassettes with the other of the respective hub openings being located concentric to each other and to the second projection means; with the first projection means preferably having an oval-shaped configuration with major and minor axes formed by first and second arcuate curved sections coinciding with the imaginary oval-shaped configuration formed by the overlapping circles, with said first curved section being adapted to coincide with an outer arcuate curved section of a reel hub opening of a first size cassette, and with said second curved section being adapted to engage an inner arcuate curved section of a second size cassette for selectively retaining either of said first and second size cassettes in the storage container; and with a pair of posts being formed adjacent the junction of the arcuate curved sections and projecting upwardly beyond the height of the curved sections.

BRIEF DESCRIPTION OF THE DRAWINGS

Preferred embodiments of the invention—illustrative of the best modes in which applicant has contemplated applying the principles—are set forth in the following description and shown in the accompanying drawings and are particularly and distinctly pointed out and set forth in the appended claims.

FIG. 14 is a fragmentary top plan view similar to FIGS. 8, 10 and 12, showing a fourth modification of the cassette retaining first projection means; and.

Similar numerals refer to similar parts throughout the drawings.

DESCRIPTION OF THE PREFERRED EMBODIMENTS

First Embodiment

Figure 1:
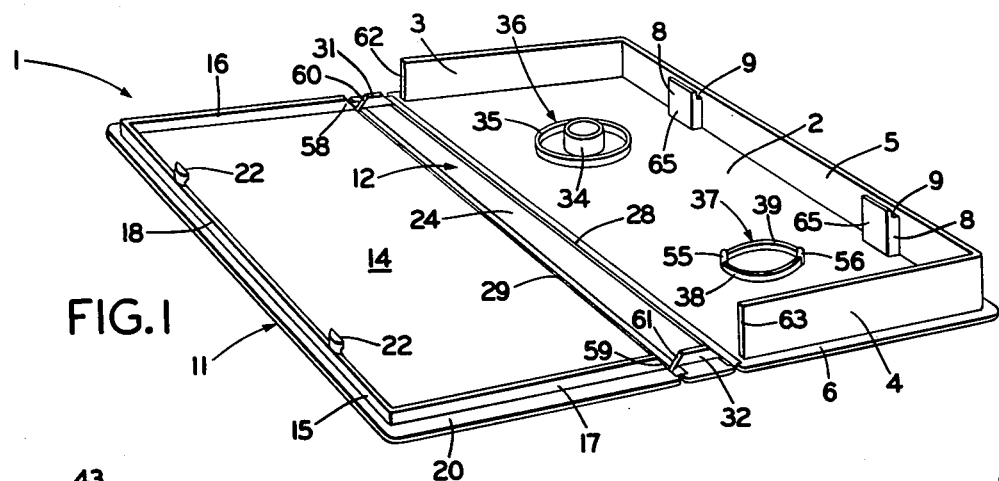
FIG. 1 is a perspective view of the improved video cassette storage container.

The improved storage container is indicated generally at 1 and is shown in FIG. 1 in an open position prior to storing a video cassette therein. Container 1 has a rectangular box-shaped configuration and forms a hollow enclosure when closed, and preferably is formed of a molded plastic material, such as polypropylene. Container 1 includes a rectangular-shaped flat bottom wall 2 with upstanding parallel end walls 3 and 4 and a front wall 5. Walls 3, 4 and 5 are formed integrally with bottom wall 2 and are arranged in a U-shaped configuration to enclosure three sides of bottom wall 2. Walls 3–5 preferably are positioned inwardly a short distance from the outer edges of bottom wall 2 to form an outer exposed U-shaped portion 6 extending between walls 3–5 and the outer edges of bottom wall 2. A pair of tab-receiving hollow members 8 are formed on the inner surface of front wall 5 and are provided with top openings 9.

A flat rectangular-shaped lid, indicated generally at 11, is movably mounted on bottom wall 2 by a double hinged panel assembly, indicated generally at 12. Lid 11 includes a top closure wall 14 similar in size and configuration to bottom wall 2. A U-shaped flange 15 is formed integrally with top wall 14 and projects outwardly from the inside surface thereof. Flange 15 includes a pair of parallel end portions 16 and 17 and an outer connecting front portion 18. Flange 15 is spaced a short distance inwardly from the outer edges of top wall 14 as are walls 3–5 of bottom wall 2, forming an L-shaped outer portion 20 on wall 14 similar to U-shaped portion 6 of bottom wall 2.

A pair of spaced tabs 22 are formed on front portion 18 of flange 15 and are adapted to frictionally engage tab-receiving members 8 when inserted through openings 9 to secure lid 11 in closed position. Tabs 22 preferably are integrally molded with flange 15 of the same plastic-type material as the container components described above.

Hinge assembly 12 includes an elongated, rectangular-shaped panel 24 formed of plastic material, preferably similar in thickness to that of bottom wall 2 and top wall 14. Panel 24 is connected to inner edges of bottom wall 2 and top wall 14 by hinges 28 and 29 (referred to as "living" hinges). Hinges 28 and 29 are relatively thin, flexible strips of plastic material molded integrally with panel 24 and bottom and top walls 2 and 14. A pair of upstanding, transversely extending flanges 31 and 32 are molded integrally with the inner surface of panel 24 adjacent the outer ends thereof and are in alignment with flange portions 16 and 17, respectively, of lid flange 15.

A pair of concentric inner and outer annular members 34 and 35 are formed integrally with bottom wall 2 and project upwardly therefrom, with inner member 34 being considerably higher than outer member 35. Members 34 and 35 are referred to throughout collectively as the second projection means 36. Projecting members 34 and 35 are of the type presently used on known cassette storage containers. These existing containers use two pairs of such annular members which project into a pair of spaced reel hub openings which are formed in the cassettes for securing the cassettes in the container.

In accordance with the invention, an oval-shaped projection, indicated generally at 37 and referred to as first projection means, is formed integrally with bottom wall 2 and is spaced longitudinally along wall 2 from annular projections 34 and 35. Projection 37 is formed by a pair of arcuate-shaped sections 38 and 39 which are joined in an end-to-end relationship to form the oval-shaped configuration. The major axis 40 of projection 37 is parallel with end walls 3 and 4 with the minor axis 41 being parallel with front wall 5. The major axis is perpendicular to an imaginary line 42 extending between the centerpoints of projections 34–35 and 37, with the minor axis coinciding with such an imaginary line. Projection sections 38–39 preferably have a height and thickness generally equal to that of outer annular projection member 35.

Figures 2, 3:
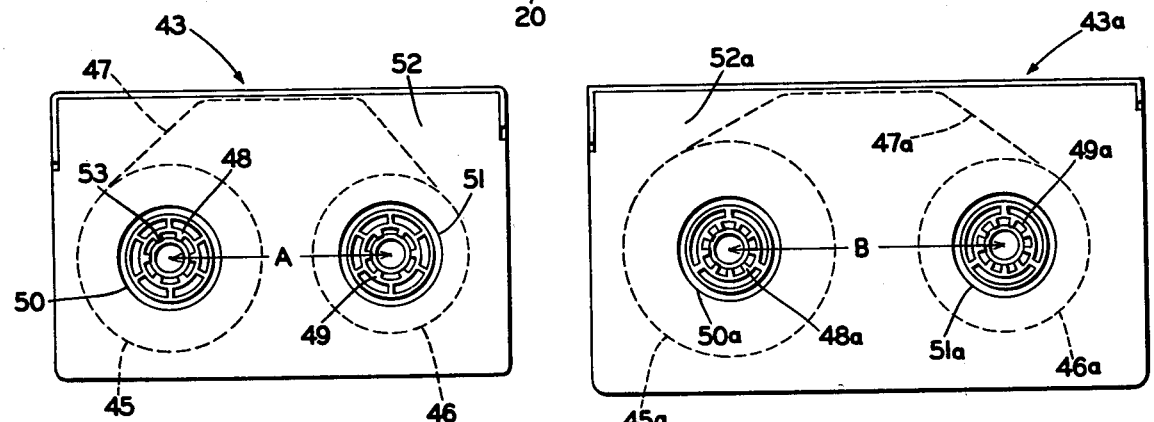
FIG. 2 is a top plan view of a small size video cassette which is adapted to be stored in the container of FIG. 1.
FIG. 3 is a top plan view similar to FIG. 2 of a larger size video cassette adapted to be stored in the container of FIG. 1.

FIGS. 2 and 3 show generally diagrammatically two sizes of cassettes of the type presently being manufactured and sold for use with a vast majority of existing video equipment and adapted for use in improved storage container 1. The smaller size cassette is indicated generally at 43 (FIG. 2) with the larger size cassette being indicated generally at 43a (FIG. 3). Cassettes 43 and 43a are generally relatively flat box-like containers having storage reels 45 and 45a and take-up reels 46 and 46a rotatably mounted therein for containing lengths of tapes 47 and 47a, respectively, therearound in a well-known manner. Reels 45 and 45a have cylindrical hubs 48–49 and 48a–49a, respectively, which are accessible for operation by the appropriate video equipment through circular holes 50–51 and 50a–51a formed in bottom walls 52 and 52a of the cassettes. Cassettes 43 and 43a are similar in most respects except that the separation between the centers of the reel hubs differ, with the hub separation distance of cassette 43 (arrow A) being shorter than that of cassette 43a (arrow B). Reel hubs 48–49 and 48a–49a usually are spring biased toward their respective openings by a well-known mounting mechanism, which mechanism forms no part of the present invention.

Figures 4, 5:
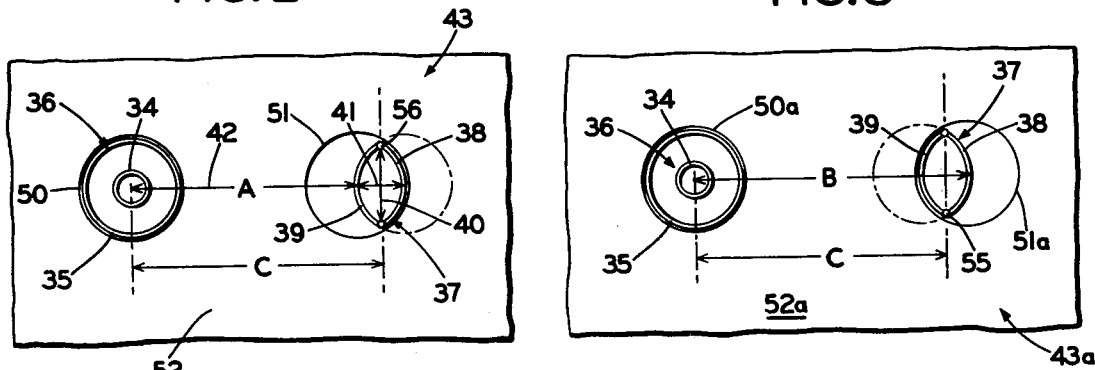
FIG. 4 is a fragmentary top plan view of the bottom wall of the container of FIG. 1 with the locations of the cassette reel hub openings being shown in full lines when mounting the small size cassette therein.
FIG. 5 is a fragmentary top plan view similar to FIG. 4 with the locations of the cassette reel hub openings being shown in full lines when mounting the larger size cassette therein.

The use of container 1 for storing both sizes of cassettes 43 and 43a is shown diagrammatically in FIGS. 4 and 5. FIG. 4 illustrates in solid lines the positions of reel hub openings 50 and 51 with respect to the first and second cassette mounting projections for engaging small cassette 43. Outer annular projection member 35 is seated concentrically within the generally complementary-shaped circular cassette opening 50, with inner annular projection member 34 extending into the inner opening 53 of reel 48. This engagement is similar to that of existing cassette containers which utilize two pairs of these concentric pairs of spaced annular projection members.

In accordance with the invention, outer arcuate section 38 of projection 37 projects into cassette opening 51 and coincides with an outer arcuate portion of opening 51, preventing movement of cassette 43 in any direction except perpendicularly upwardly therefrom. Inner projection section 39 abuttingly engages reel hub 49 and will depress the same inwardly into the cassette and overcome the spring bias mounting of the reel hub when a downward pressure is exerted on the cassette, as will occur when lid 11 is moved to a closed position.

FIG. 5 illustrates the positions of reel hub openings 50a and 51a with respect to the cassette mounting flanges 34, 35 and 37 for storing large cassette 43a. Annular flanges 34 and 35 are seated concentrically within the cassette opening 50a and reel hub opening 53a as when storing small cassette 43, discussed above. In accordance with the invention, inner flange section 39 projects into cassette opening 51a and coincides with an inner arcuate portion of the cassette opening and together with second projection means 36 prevents movement of cassette 43a in any direction except perpendicularly upwardly from the various retaining flanges. Outer flange section 38, in turn, engages reel 49a, depressing the same inwardly into the cassette overcoming the spring bias of the reel when lid 11 is moved to a closed position in a similar manner as discussed above with respect to the storage of small cassette 43.

A pair of posts 55 and 56 preferably are formed at the junction of arcuate flange sections 38 and 39 and project upwardly from bottom wall 2 a greater vertical distance than the height of flange sections 38 and 39. Posts 55 and 56 are adapted to extend into recessed portions formed in the reel hubs 49 and 49a to prevent the cassette from moving with respect to oval-shaped projection 37 until lid 11 is moved to a closed position. When in closed position, top wall 14 presses the cassette downwardly forcing arcuate sections 38 and 39 into the respective cassette opening 51 or 51a, overcoming the biasing of the hub spring to firmly secure and hold the cassette within the container. Posts 55 and 56 are not critical to the concept of the invention although they may assist in retaining the cassettes in position once the lid is in fully closed position when used in conjunction with arcuate sections 38 and 39. However, posts 55 and 56 do enhance the operation and advantages of improved container 1 by preventing any pivotal movement of the cassette with respect to the second projection means 36 when the cassette is placed in container 1 in a stored position prior to closing lid 11.

Figure 6:
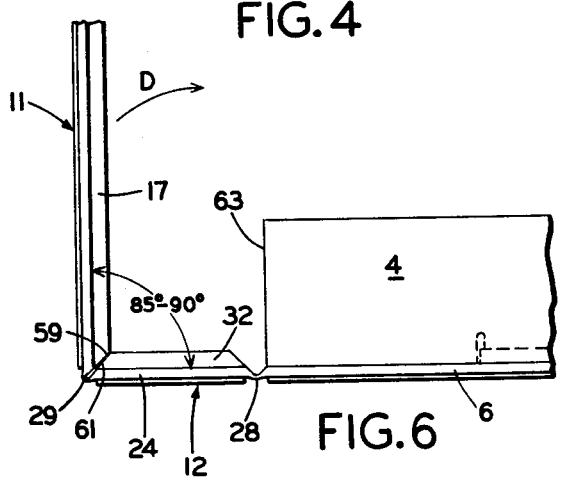
FIG. 6 is a fragmentary side elevational view showing the improved container hinge and lid configuration in a partially closed position.
Figure 7:
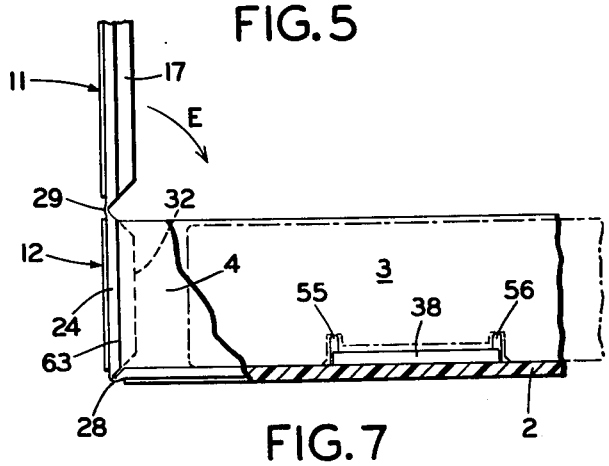
FIG. 7 is a fragmentary side elevational view similar to FIG. 6 showing the container lid and flange in a partially closed position with a portion of the container broken away and in section with one of the cassettes being shown in dot-dash lines mounted on the oval-shaped retaining projection.

In accordance with another feature of the invention, container 1 is provided with a lid-aligning feature shown particularly in FIGS. 6 and 7. Inner edges 58 and 59 of lid flange portions 16 and 17, respectively, are slanted downwardly at a predetermined angle (preferably 45°), whereby when abuttingly engaged with the aligned tapered edges 60 and 61 of hinge panel flanges 31 and 32, respectively, position lid 11 at an angle of approximately 85° to 90° with respect to hinge panel 24 (FIG. 6). After assuming the position of FIG. 6, lid 11, together with hinge assembly 12, pivot in unison in the direction of arrow D about inner hinge strip 28 to a closed position, wherein vertical edges 62 and 63 of end walls 3 and 4, respectively, abut the outer portions of hinge panel 24, with hinge panel flanges 31 and 32 being in close proximity with and inwardly of end walls 3 and 4. U-shaped lid flange 15, in turn, is in close proximity with and inwardly of the top portions of walls 3, 4 and 5. This relatively close alignment of flanges 31–32 and flange 15 with the end and top edges of container walls 3, 4 and 5 provides the relatively dust-free feature of improved container 1.

Since top wall 14 is prevented from moving forwardly beyond the predetermined angle of 85° to 90° with respect to hinge panel 24 by the abutting engagement of angled edges 58–61 upon closing of lid 11, tabs 22 will properly align with and be received in openings 9 of tab-receiving members 8 to secure lid 11 in closed position. Lid tabs 22 have a thickness slightly greater than the size of top openings 9 of receiving members 8 so as to provide a force-fit engagement therewith. Rear walls 65 of tab-receiving members 8 have a tapered top surface adjacent openings 9 facilitating the insertion of locking tabs 22 therein. Walls 65 will have sufficient flexibility to be forced outwardly by the insertion of tabs 22 to frictionally retain the tabs therein when lid 11 is in this closed position.

Should lid 11 be moved to a closed position by first pivotal movement of hinge strip 28, as shown in FIG. 7, rather than the initial pivotal movement of hinge strip 29 (FIG. 6), locking tabs 22 will still properly align with and be received in tab-receiving members 8. Upon being closed in this alternate manner, vertical edges 62 and 63 of end walls 3 and 4 will aubuttingly engage the outer portions of hinge panel 24, limiting further movement of panel 24, assuming the position of FIG. 7. Upon reaching the position of FIG. 7, continued pivotal movement of lid 11 will result only in pivotal movement of lid 11 in the direction of arrow E about hinge strip 29 until engagement of edges 58–63, whereupon tabs 22 will be lockingly received within members 8. This particular arrangement, particularly the abutting engagement of angled edges 58–61, whereby lid 15 is prevented from closing any less than 85° to 90° with respect to hinge panel 24, prevents tabs 22 from under to over shooting openings 9 upon movement of lid 11 to a closed position.

Thus, anyone using improved container 1 need not be concerned with the manner in which lid 11 is closed after placement of a cassette therein since tabs 22 will always be properly aligned with and received in the retaining or locking members 8 regardless of the manner in which the lid is closed.

Although the improved first projection means of storage container 1 which enables two different size cassettes to be securely mounted and stored within a single container, is shown and described above as being formed by arcuate-shaped flange sections 38 and 39, this exact oval-shaped configuration is not critical for achieving these results. In accordance with the invention, this same result can be achieved by various projection arrangements, several embodiments being shown in FIGS. 8–15 and described below.

In the preferred embodiment of improved first projection means 37 arcuate flange sections 38–39 are semicircles with their radii of curvature being equal to each other and to minor axis 41. Major axis 40 is equal to the diameter of outer annular member 35 of second projection means 36. Furthermore the vertical heights of arcuate sections 38–39 preferably are equal to the vertical height of annular member 35.

Second Embodiment

Figure 8:
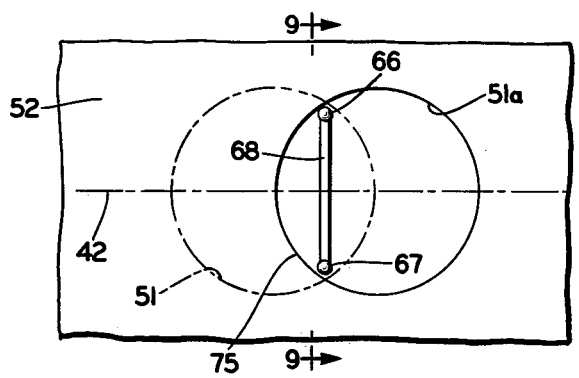
FIG. 8 is an enlarged fragmentary top plan view similar to FIGS. 4 and 5, showing a modified form of the improved projection means engaged within the reel hub openings, shown in full and dot-dash lines, of the two different size cassettes.
Figure 9:
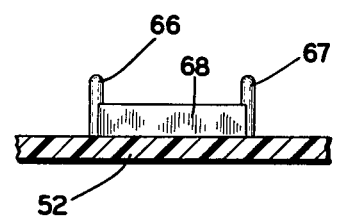
FIG. 9 is a fragmentary sectional view taken on line 9—9, FIG. 8.

FIGS. 8 and 9 show the first projection means being formed by a pair of spaced individual posts 66 and 67, which are similar to posts 55 and 56, but without any intervening arcuate sections 38–39. A single bar-like member 68 may be formed integrally with posts 66 and 67 and extend therebetween transversely with respect to imaginary centerline 42. Bar-like member 68 does not engage the edges of the cassette wall openings 51 and 51a and is provided primarily to strengthen spaced posts 66 and 67. The location of spaced projection posts 66 and 67 is determined by the intersection of two imaginary overlapping circles representing hub opening 51 (dot-dash lines) and hub opening 51a (full line) of cassettes 43 and 43a, respectively, when the other hub openings 50 and 50a are aligned concentrically to each other and to the centerpoint of second projection means 36. Thus, the transverse separation between posts 66 and 67 and their longitudinal spacing from the centerpoint of second projection means 36 will vary in direct relationship to the longitudinal spacings A and B between the two sizes of cassettes adapted to be stored in improved container 1 so long as spacings A and B are of such dimensions whereby their respective cassette openings 51 and 51a overlap each other, when so arranged as shown in FIGS. 4 and 5.

Third Embodiment

Figure 10:
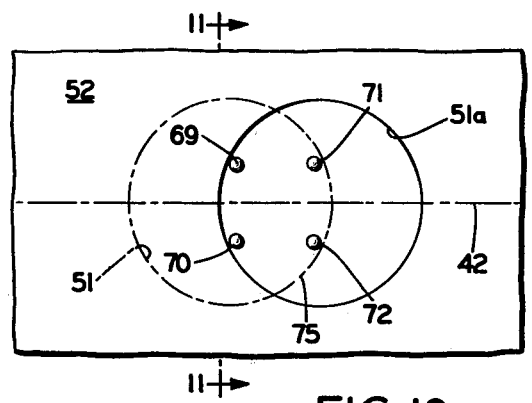
FIG. 10 is a fragmentary top plan view similar to FIG. 8 showing another modified form of the cassette retaining first projection means.
Figure 11:
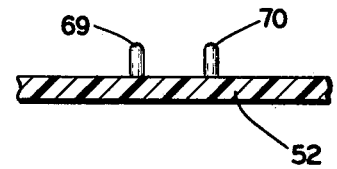
FIG. 11 is a fragmentary sectional view taken on line 11—11, FIG. 10.

FIGS. 10 and 11 show another modified first projection means which is formed by two pairs of spaced projection posts 69–70 and 71–72. Posts 69–72 are located adjacent an imaginary oval-shaped pattern 75 formed by the overlapping portions of the above-discussed two imaginary circles. The individual posts of each post pair 69–70 and 71–72 are located equidistant on opposite sides on imaginary centerline 42. Spaced posts 69 and 70 will engage cassette opening 51a when larger cassette 43a is stored in container 1, and posts 71–72 will engage cassette opening 51 when the smaller cassette 43 is stored in container 1, in similar manners as do arcuate flange sections 38 and 39.

Fourth Embodiment

Figure 12:
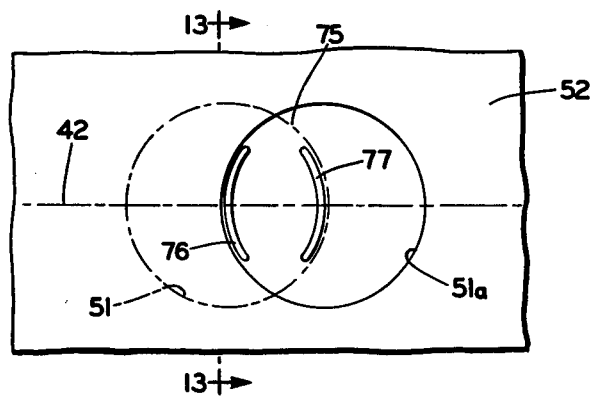
FIG. 12 is a fragmentary top plan view similar to FIGS. 8 and 10, showing a still further modified cassette retaining first projection means.
Figure 13:
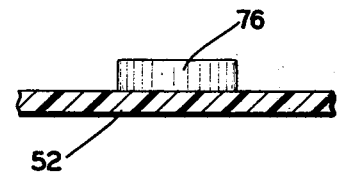
FIG. 13 is a fragmentary sectional view taken on line 13—13, FIG. 12.

FIGS. 12 and 13 illustrate another modification or embodiment of the improved first projection means which uses a pair of arcuate-shaped curved sections 76 and 77 which are positioned similar to that of arcuate sections 38 and 39. Sections 76 and 77 have shorter arcuate lengths than sections 38 and 39 and do not meet in an end-to-end relationship at the intersections of the two imaginary circles. The functions of arcuate sections 76 and 77 are similar to that of the full semicircular-shaped arcuate sections 38 and 39 and need not be described in detail.

Fifth Embodiment

Figure 14:
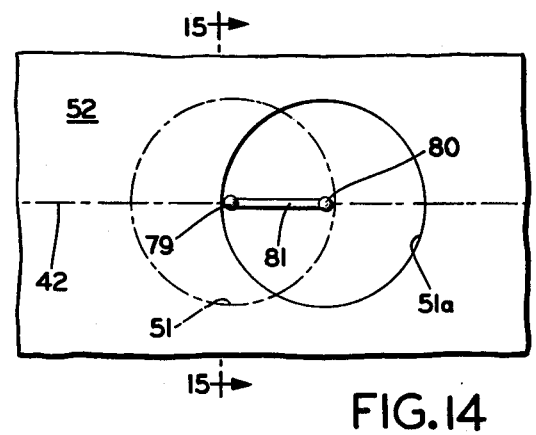
Figure 15:
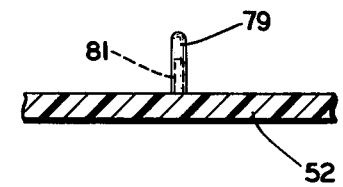
FIG. 15 is a fragmentary sectional view taken on line 15—15, FIG. 14.

FIGS. 14 and 15 show still a further embodiment of the improved projection means in which a pair of spaced posts 79 and 80, in conjunction with a connecting reinforcing bar 81, extend longitudinally with and coincide with imaginary centerline 42 instead of extending transversely thereto as in the second embodiment shown in FIGS. 8 and 9. Inner posts 79 will engage large cassette opening 51a and outer post 80 will engage small cassette opening 51 when cassettes 43a and 43, respectively, are stored in improved container 1. The longitudinal separation between posts 79 and 80 is generally equal to the minor axis of the imaginary oval-shaped pattern 75 formed by the above-discussed overlapping circles.

IN GENERAL

It is easily seen that the particular shape and configuration of the improved first projection means can vary in addition to the embodiments shown in the drawings and described above. It is necessary that the particular arrangement of the projecting members provide two transversely spaced members, posts, etc., at the junction of the two overlapping circles or end points of the imaginary oval-shaped pattern 75 (FIG. 8), or provide other projections generally coinciding with the arcuate portions of pattern 75 (FIGS. 10 and 12), or provide a pair of longitudinally spaced projection posts etc. (FIG. 14). Also, if desired, the first projection means could be a solid member conforming to the oval-shaped pattern 75 or other arrangement of projecting posts, etc.

The particular oval-shaped or double arcuate-shaped flange sections 38 and 39 of FIGS. 1–5 are believed preferable to the other embodiments shown and described in that they provide a broader surface area for engagement with the edges of the cassette wall hub openings. This greatly increases the strength of the improved first projection means than may be possible with other spaced post configurations or other similar arrangements.

Although the drawings and above description show the first and second projection means as being formed on the bottom wall 2, that is, the wall having side and end walls 3–5 mounted thereon, these projections could be formed on the inner surface of top wall 14 without affecting the concept of the invention. Likewise, second projection means 36, which is shown and described as being a pair of concentric annular members 34 and 35, may have numerous other configurations without affecting the advantages achieved by the improved first projection means.

Improved storage container 1 has a number of advantageous features. The principle advantage is the ability to receive and firmly secure two different sizes of individual video cassettes which have different hub reel openings formed in the cassette walls, particularly since such two sized cassettes presently constitute the vast majority of video cassettes being manufactured and sold today. Another advantage is that container 1 is provided with the self-aligning lid feature, whereby an individual need not be concerned when closing the container since the locking projections always will be properly aligned with the receiving members due to the particular angled flange arrangement formed on the lid and hinge panel. Likewise, all of these advantages can be achieved by inexpensively molding the improved container entirely and integrally of a strong and durable plastic-type material, eliminating any additional separate components and associated additional manufacturing steps, since these additional components would be subject to loss or misplacement during use. Accordingly, the improved container provides such a construction which is effective, safe, inexpensive, efficient in assembly, operation and use, and which achieves all the enumerated objectives, provides for eliminating difficulties encountered with prior containers and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved video cassette storage container is constructed, assembled and operated, the characteristics of the new construction, and the advantageous, new and useful results obtained; the new and useful structures, devices elements, arrangements, parts, and combinations are set forth in the appended claims.

I claim:

1. An improved box-like storage container construction of the type having spaced side, end, top and bottom walls forming a hollow enclosure for containing a cassette therein, in which first and second projection means are mounted on either the top or bottom walls and are spaced from each other a predetermined distance on said wall for projecting into a pair of spaced reel hub openings formed in a cassette for positioning and retaining the cassette in said container, wherein the improvement includes: the first projection means having an oval-shaped configuration with major and minor axes formed by first and second arcuate curved sections, with said first curved section being adapted to coincide with an outer arcuate curved section of a reel hub opening of a first size cassette, and with said second curved section being adapted to engage an inner arcuate curved section of a second size cassette for selectively retaining either of said first and second size cassettes in the storage container.

2. The container construction defined in claim 1 in which the second projection means is a pair of inner and outer concentric annular members with said inner member having a greater vertical height than the outer member.

3. The container construction defined in claim 2 in which the major axis of the oval-shaped first projection means is generally equal to the diameter of the outer annular member of the second projection means.

4. The container construction defined in claim 2 in which the vertical height of the first projection means is generally equal to the vertical height of the outer annular member of the second projection means.

5. The container construction defined in claim 1 in which the major axis of the oval-shaped first projection means is perpendicular to an imaginary line extending between the centerpoints of the first and second projection means.

6. The container construction defined in claim 1 in which post means are formed adjacent the junction of the arcuate curved sections and project upwardly beyond the height of said curved sections for engaging the reel hub of a cassette being stored in the container.

7. The container construction defined in claim 1 in which each of the arcuate curved sections has a semicircular configuration.

8. The container construction defined in claim 7 in which the radii of curvature of the arcuate curved sections are equal to each other and are equal to the minor axis of the first projection means.

9. The container construction defined in claim 1 in which the first and second projection means are mounted on the bottom wall which has a rectangular configuration; and in which the minor axis of the first projection means extends in the direction of a longitudinal axis of said bottom wall.

10. An improved box-like storage container construction of the type having spaced side, end, top and bottom walls forming a hollow enclosure for selectively containing first and second different size cassettes therein, in which each of the cassettes is formed with a pair of spaced reel hub openings with the spacing between the hub openings of the second cassette being greater than the spacing between the hub openings of the first cassette, and in which first and second projection means are mounted on either the top or bottom walls of the container and are spaced longitudinally from each other a predetermined distance on said wall for projecting into the pair of spaced reel hub openings formed in the cassettes for positioning and retaining individual first and second cassettes in said container, wherein the improvement includes: the first projection means being formed by a plurality of spaced projections located adjacent to an imaginary oval-shaped pattern formed by two overlapping arcuate portions of two circles, with each of said circles representing a respective one opening of each of the hub openings of the first and second cassettes when the other of the respective hub openings is located concentric to each other and to the second projection means.

11. The container construction defined in claim 10 in which the top wall is hingedly mounted on the bottom wall by a double hinged panel assembly including an elongated panel and a pair of flexible hinge strips pivotally connecting the panel to the bottom and top walls.

12. The container construction defined in claim 11 in which a pair of upstanding transversely extending flanges are formed on the elongated panel adjacent the ends thereof; in which a pair of upstanding flanges are formed adjacent to and extend along side edges of the top wall so as to lie adjacent to and inwardly of the side walls of the container when the top wall is in a closed position; in which the flanges of the elongated panel and of the top wall are in longitudinal alignment with each other and are formed with tapered adjacent edges which abuttingly engage each other upon pivotal movement of the top wall toward closed position; and in which the adjacent tapered edges have predetermined angles limiting pivotal movement of the top wall to an angle of between 85° and 90° with respect to the elongated panel of the hinged panel assembly.

13. The container construction defined in claim 12 in which the adjacent abutting edges of the top wall and elongated panel are tapered to form included angles of approximately 45°.

14. The container construction defined in claim 10 in which the container construction is formed of a molded, polypropylene plastic material.

15. The container construction defined in claim 10 in which the spaced projections of the first projection means are a pair of posts located at the intersection of the two circles at the junction of the two arcuate portions.

16. The container construction defined in claim 10 in which the spaced projections of the first projection means are two pairs of spaced projections, with each pair of projections being located adjacent a respective one of the arcuate portions and on opposite sides of an imaginary centerline extending between the centerpoints of the first and second projection means.

17. The container construction defined in claim 10 in which the spaced projections of the first projection means are a pair of spaced posts located on an imaginary centerline extending between the centerpoints of the first and second projection means.

18. The container construction defined in claim 10 in which the spaced projections of the first projection means are a pair of arcuate-shaped projections forming an oval-shaped projection coinciding with the imaginary oval-shaped pattern.

19. The container construction defined in claim 18 in which a pair of posts are formed at the junction of the pair of arcuate-shaped projections.

20. An improved box-like storage container construction of the type having spaced side, end, top and bottom walls forming a hollow enclosure for selectively containing first and second different size cassettes therein, in which each of the cassettes is formed with a pair of spaced reel hub openings with the spacing between the second cassette openings being greater than the spacing between the first cassette openings, and in which first and second projection means are mounted on either the top or bottom walls of the container and are spaced longitudinally from each other a predetermined distance on said wall for projecting into the pair of spaced reel hub openings formed in the cassettes for positioning and retaining individual first and second cassettes in said container, wherein the improvement includes: the first projection means including at least a pair of transversely spaced projections, said projections being located adjacent the imaginary intersection of two overlapping circles representing a respective opening of each of the hub openings of the first and second cassettes with the other of the respective hub openings being located concentric to each other and to the second projection means.

* * * * *

UNITED STATES PATENT AND TRADEMARK OFFICE
CERTIFICATE OF CORRECTION

PATENT NO. : 4,184,594
DATED : January 22, 1980
INVENTOR(S) : Bruce A. Hehn

It is certified that error appears in the above-identified patent and that said Letters Patent are hereby corrected as shown below:

Inventor's address: change "Clairsville" to -St. Clairsville-

Column 1, line 41, change "These" to -There-

Column 3, line 63, change "enclosure" to -enclose-

Signed and Sealed this

Fifteenth Day of April 1980

[SEAL]

Attest:

SIDNEY A. DIAMOND

Attesting Officer

Commissioner of Patents and Trademarks